(12) United States Patent
Hanson et al.

(10) Patent No.: US 7,803,360 B2
(45) Date of Patent: Sep. 28, 2010

(54) WATER-DEGRADABLE FISHING LURE

(75) Inventors: Russell W. Hanson, Livingston, AL (US); Samuel L. Gott, Kingsport, TN (US)

(73) Assignee: Biobait, Inc., Livingston, AL (US)

( * ) Notice: Subject to any disclaimer, the term of this patent is extended or adjusted under 35 U.S.C. 154(b) by 538 days.

(21) Appl. No.: 11/799,032

(22) Filed: Apr. 30, 2007

(65) Prior Publication Data

US 2008/0263934 A1 Oct. 30, 2008

(51) Int. Cl.
*A01N 25/00* (2006.01)
*A01K 85/00* (2006.01)
*A01K 85/01* (2006.01)
*C08K 5/15* (2006.01)
*C08K 5/1515* (2006.01)

(52) U.S. Cl. .................. 424/84; 43/42; 43/42.06; 426/1; 524/114

(58) Field of Classification Search ............. None
See application file for complete search history.

(56) References Cited

U.S. PATENT DOCUMENTS

| | | | |
|---|---|---|---|
| 2,827,376 A | 3/1958 | Breuer | |
| 3,497,985 A | 3/1970 | Margulies | |
| 3,931,414 A | 1/1976 | Popeil | |
| 3,942,281 A | 3/1976 | Hill | |
| 3,953,934 A | 5/1976 | Visser | |
| 3,964,203 A | 6/1976 | Williams, Jr. | |
| 3,988,479 A | 10/1976 | Stephan et al. | |
| 4,076,846 A | 2/1978 | Nakatsuka et al. | |
| 4,160,847 A | 7/1979 | Orth, Jr. | |
| 4,202,905 A | 5/1980 | Asai et al. | |
| 4,530,179 A * | 7/1985 | Larew .................. | 43/42.06 |
| 4,589,223 A * | 5/1986 | Hastings .................. | 43/42.24 |
| 4,596,085 A | 6/1986 | Cotillier | |
| 4,731,247 A | 3/1988 | Wolford et al. | |
| 4,875,305 A | 10/1989 | Bridges | |
| 4,883,620 A | 11/1989 | Follett | |
| 4,887,376 A | 12/1989 | Sibley et al. | |
| 4,890,411 A | 1/1990 | Buccilli et al. | |
| 4,910,908 A | 3/1990 | Rosenburg | |
| 4,927,643 A | 5/1990 | D'Orazio et al. | |
| 5,007,194 A | 4/1991 | Coody | |
| 5,062,235 A | 11/1991 | Cook, Jr. et al. | |
| 5,065,541 A | 11/1991 | Coody | |
| 5,089,277 A | 2/1992 | Prochnow | |
| 5,170,580 A | 12/1992 | Rosenblatt | |
| 5,197,219 A | 3/1993 | Cook, Jr. et al. | |
| 5,243,779 A | 9/1993 | Reed | |
| 5,266,323 A | 11/1993 | Guthrie et al. | |
| 5,270,044 A | 12/1993 | Fulmer et al. | |
| 5,276,993 A | 1/1994 | Rosenblatt | |
| 5,374,600 A | 12/1994 | Hozumi et al. | |
| 5,446,079 A | 8/1995 | Buchanan et al. | |
| 5,511,338 A | 4/1996 | Costanzo | |
| 5,640,798 A | 6/1997 | Garst | |
| 5,641,847 A | 6/1997 | Hozumi et al. | |
| 6,037,039 A | 3/2000 | Koike et al. | |
| 6,079,146 A | 6/2000 | Larsen | |
| 6,103,809 A | 8/2000 | Ahmed et al. | |
| 6,174,525 B1 * | 1/2001 | Kelley .................. | 424/84 |
| 6,363,651 B1 | 4/2002 | Garst | |
| 6,428,900 B1 | 8/2002 | Wang | |
| 6,586,354 B1 | 7/2003 | Topolkaraev et al. | |
| 6,753,004 B2 | 6/2004 | Ollis et al. | |
| 6,767,972 B1 | 7/2004 | Irick, Jr. et al. | |
| 6,821,538 B2 | 11/2004 | Axelrod et al. | |
| 6,827,930 B2 | 12/2004 | Cobb et al. | |
| 2004/0018272 A1 | 1/2004 | Chen | |
| 2006/0008445 A1 | 1/2006 | Garralda et al. | |
| 2007/0034835 A1 | 2/2007 | Horton | |
| 2007/0036746 A1 | 2/2007 | Hester et al. | |
| 2007/0112104 A1 * | 5/2007 | Kaytan .................. | 524/99 |

FOREIGN PATENT DOCUMENTS

| | | |
|---|---|---|
| DE | 4428763 | 5/1996 |
| JP | 11075626 | 3/1999 |
| JP | 11169025 | 6/1999 |
| JP | 2000157103 | 6/2000 |
| JP | 2001299151 | 10/2001 |
| JP | 2002084926 | 3/2002 |
| JP | 2002272321 | 9/2002 |
| JP | 2003009721 | 1/2003 |
| JP | 2003-259766 | 9/2003 |
| WO | WO 03/003825 A1 | 1/2003 |

OTHER PUBLICATIONS

"What is Green Plastics," Biodegradable Plastics Society, (1999-2005), 3 pages.
"Tt: DuPont goes biodegradable," Sep. 27, 1997, 2 pages.
"Eastman AQ 1950 Copolyester," Eastman, 2005, 1 page.
"Eastman AQ 14000 Copolyester," Eastman, 2005, 1 page.
International Search Report and Written Opinion for PCT/US2008/061502, 2008, dated Sep. 10, 2008, ten pages.

* cited by examiner

*Primary Examiner*—Yvonne L Eyler
*Assistant Examiner*—Christopher R Lea
(74) *Attorney, Agent, or Firm*—Kilyk & Bowersox, P.L.L.C.

(57) ABSTRACT

A fishing lure that is water-degradable is described. The fishing lure can be a polymeric fishing lure. The fishing lure can have a body that includes vinyl resin and epoxy plasticizer, and may also include one or more of a supplemental plasticizer, heat stabilizer and/or fish attractant, and wherein the body is degradable upon immersing the body in water a body.

22 Claims, No Drawings

WATER-DEGRADABLE FISHING LURE

FIELD OF THE INVENTION

The present invention relates to a water-degradable fishing lure. In particular, the present invention relates to a fishing lure that retains acceptable physical properties over a period of use and immersion in water, but that has the property of decomposing over time.

BACKGROUND OF THE INVENTION

Most artificial fishing lures are currently produced from synthetic non-degradable polymer composites. These polymer composites are typically made from silicon rubber or polyvinylchloride that is mixed with low molecular weight plasticizers. Unfortunately, these lures do not degrade when they are discarded into the environment, and thus become aquatic pollutants. Also, if a fish consumes a released lure, the lure will remain undigested in its gastrointestinal tract and will block its normal digestion of food. This stunts fish growth and could eventually kill the fish. As the number of fishermen increase, the above problems will magnify and artificial non-degradable synthetic lures will become more unacceptable.

Degradable fishing lures produced from natural and/or food grade ingredients have been developed and are commercially available. These lures degrade in water, but have disadvantages that have limited their acceptance by fishermen. Most sport and commercial fishermen will not accept degradable fishing lures unless, during short-term water exposure, they have physical properties similar to existing non-degradable artificial fishing lures. In particular, degradable fishing lures from natural or food grade ingredients may lack one or more of the following physical properties: (1) high flexibility and elasticity for proper lure movement through the water, (2) toughness and cohesive strength that enables a hook to be retained after the lure is repeatedly stressed from water impacts during castings and water drag forces during trolling, and (3) a surface topology that mimics the feel and appearance of live baits. In addition, the properties of a degradable fishing lure should not rapidly change when it is removed from its packaging or during several hours of fishing. Food based artificial lures may be perishable on long term storage and typically, either lose water on air exposure and become brittle or absorb water on water immersion and quickly become too soft to be acceptable fishing lures.

Accordingly, there is a need to provide a fishing lure that has the properties of high flexibility and elasticity for proper lure movement through the water, toughness and cohesive strength that enables a hook to be retained after the lure is repeatedly stressed from water impacts during castings and water drag forces during trolling, and a surface topology that mimics the feel and appearance of live baits and that degrades after prolonged exposure to water.

Further, there is a need to provide a fishing lure that degrades after prolonged exposure to water and that is a composite of different materials that can be selected to provide a desired degree of flexibility, elasticity, hardness, toughness, cohesive strength and slippery feel. Further, there is a need to provide a fishing lure that contains a fish attractant that can be released gradually during exposure to water.

Further, there is a need to provide a water-degradable fishing lure that is stable during long term storage.

SUMMARY OF THE INVENTION

A feature of the present invention is to preferably provide a fishing lure that has the properties of high flexibility and elasticity for proper lure movement through the water, toughness and cohesive strength that enables a hook to be retained after the lure is repeatedly stressed from water impacts during castings and water drag forces during trolling, and a surface topology that mimics the feel and appearance of live baits and that degrades after prolonged exposure to water.

Another feature of the present invention is to provide a fishing lure that contains a fish attractant that can be released gradually during exposure to water.

Still another feature of the present invention is to provide a fishing lure wherein the degree of flexibility, elasticity, hardness, toughness, cohesive strength and slippery feel of the body of the fishing lure may be controlled during manufacture.

Additional features and advantages of the present invention will be set forth in the description which follows, and, in part, will be apparent from the description, or may be learned by practice of the present invention. The features and other advantages of the present invention will be realized and attained by means of the elements and combinations particularly pointed out in the written description and the claims.

To achieve these and other advantages, and in accordance with the purposes of the present invention as embodied and broadly described herein, the present invention relates to a fishing lure that comprises a body made up of vinyl resin and an epoxy plasticizer, and wherein the body is degradable upon immersing the body in water for a period of time. The body may further contain one or more of a supplemental plasticizer, heat stabilizer, and/or a fish attractant, and/or other ingredients.

As a non-limiting example, the vinyl resin component of the lure body may be a vinyl dispersion resin. It may be selected, for example, from one or more of the following classes of polyvinyl chloride (PVC) dispersion grade resins: PVC homopolymer dispersion grade resins, PVC-polyvinyl acetate (PVA) copolymer dispersion grade resins, PVC homopolymer extender grade resins, and PVC-PVA copolymer extender grade resins. As a non-limiting example, the epoxy plasticizer can be an epoxidized oleochemical, such as an epoxidized fatty acid ester that performs as a biodegradable plasticizer and acid scavenger/neutralizer in the presence of vinyl resins. The epoxy plasticizer may be, for example, epoxidized soybean oil, epoxidized linseed oil, epoxidized tall oil, epoxidized crambe oil, epoxidized lunaria oil, octyl epoxy stearate, coronaric acid, vemolic acid, and alchornic acid, and the like.

As indicated, the lure body also may include additional components, such as one or more of a supplemental plasticizer, heat stabilizer, and/or fish attractant. As non-limiting examples, the supplemental plasticizer may be selected from citrate plasticizers, methyl esters of hydrogenated rosins, polyester plasticizers, and/or dipropylene glycol dibenzoate. In a particular embodiment, the supplemental plasticizer is a citrate plasticizer, for example, a citric acid ester such as acetyltri-n-butyl citrate, triethyl citrate, acetyltriethyl citrate, tri-n-butyl citrate, acetyltri-n-hexyl citrate, n-butyryltri-n-hexyl citrate, singly or in combinations thereof. As non-limiting examples, the heat stabilizer may be, for example, a heat stabilizer and chlorine scavenger relative to the vinyl resin component, such as a mixed metal salt blend, which may be selected from one or more of barium/zinc (Ba/Zn), calcium/zinc (Ca/Zn), and/or aluminum/magnesium/calcium/zinc (Al/Mg/Ca/Zn), and so forth. As non-limiting examples, the fish attractant may be selected, for example, from menhaden oil, hydrolyzed fish protein, fish oil, fish meal, ground crustaceans, ground mussels, fish powder, fruit, spices, garlic, garlic oil, glitter materials, and/or coloring agents. For example, the fish attractant may have a scent that is released in active form upon immersing the body in water. Menhaden oil, if used as fish attractant, also may impart plasticizer effects. An antioxidant effective to stabilize color of the menhaden oil, such as a high molecular weight hindered phenol, also may be used in conjunction with menhaden oil or other lure body ingredients that may be adversely affected by sunlight exposure.

The physical properties of the fishing lure may be modified by selecting the ratio of the components that make up the body of the fishing lure. For example, the rate at which the body of the fishing lure degrades upon immersion of the body in water and the rate at which the fish attractant is released in active form may be selected by selecting the relative amounts of the vinyl resin and epoxy plasticizer, and, if present, any supplemental plasticizer, heat stabilizer, fish attractant and or other ingredients.

In various embodiments, a fishing lure is provided comprising a body that is degradable over time upon immersing the body in water, wherein the body comprises about 5% to about 30% by weight vinyl resin, about 10% to about 80% by weight epoxy plasticizer, 0 to about 85% by weight supplemental plasticizer, 0 to about 25% by weight fish attractant, 0 to about 0.5% by weight antioxidant, and 0 to about 2% by weight heat stabilizer. In a particular embodiment, the fishing lure comprises about 10% to about 20% by weight vinyl resin, about 15% to about 70% by weight epoxy plasticizer, 7% to about 70% by weight citrate plasticizer, 1 to about 20% by weight menhaden oil, 0 to about 0.1% by weight antioxidant, and 0.1% to about 1.5% by weight heat stabilizer.

In various embodiments, the fishing lure has feel, flexibility, elasticity and hook setting properties that are consistent with what is needed for fishing. The lure also can be stored stably in packaging or as exposed to ambient air such as in a tackle box, and so forth. The lure also exhibits very limited if any initial degradation when immersed in water for short periods of time, but undergoes significant structural degradation when immersed in water for prolonged periods of time. The lure preferably degrades slowly in water so that after the body is immersed in fresh water (but can be salt water) at an ambient temperature (e.g., 25° C.) for 24 hours, the body has slow initial declining tensile strength at break, tear strength, modulus at 10% elongation, elongation at break, energy to break, and/or a torsional modulus, as compared to the initial prewetted properties. However, after prolonged immersion in water, the fishing lure begins to completely degrade. In this manner, lure bodies made according to various embodiments of the present invention provide a reasonable amount of functional robustness for intermittent immersions in water consistent with fishing lure applications, but when immersed for a prolonged period time will significantly degrade to lessen impact on any aqueous environment where the lure may be retained. It is to be understood that both the foregoing general description and the following detailed description are exemplary and explanatory only and are intended to provide a further explanation of the present invention, as claimed.

DETAILED DESCRIPTION OF THE PRESENT INVENTION

The present invention relates to a fishing lure that is water-degradable over time, such as within 1 month, 3 months, 6 months, or 1 year (e.g., 6 months to 1 year or more) or more. The fishing lure is generally synthetic, such as polymeric in nature, and can contain one or more additional components that are polymeric or non-polymeric. The fishing lure is preferably not degradable outside of water and, therefore, is preferably not biodegradable from the standpoint of degrading in air, including when stored in packaging or in a tackle box, and so forth. The water-degradable fishing lure may be degradable in soil, though at a slower degrading period, and depending on such factors as the amount of moisture in the ground. The fishing lure ideally is non-toxic to the water environment and ideally each component of the fishing lure is non-toxic. In one aspect, the present invention relates to a fishing lure that comprises a body formed with and comprising vinyl resin and epoxy plasticizer, wherein the body is degradable upon immersing the body in water. One or more of a supplemental plasticizer, heat stabilizer for the vinyl resin, and/or fish attractant also may be included in the moldable lure composition.

The vinyl resin component of the lure body may be a vinyl dispersion resin. It may be selected, for example, from one or more of the following classes of polyvinyl chloride (PVC) dispersion grade resins: PVC homopolymer dispersion grade resins, PVC-PVA copolymer dispersion grade resins, PVC homopolymer extender grade resins, and PVC-PVA copolymer extender grade resins. The vinyl resin dispersion may have a defined number average molecular weight of from about $4\times10^4$ to about $8.5\times10^4$, particularly about $6\times10^4$ to about $8\times10^4$, and more particularly about $7\times10^4$ to about $7.5\times10^4$. They may have a particle size distribution and surface characteristics that can form fluid plastisols with plasticizers. Commercial sources of vinyl resin components include, for example, Geon® 121, Polyone, Avon Lake Ohio, which is a homopolymer PVC dispersion resin. These resins offer low Brookfield viscosities, such as 2000 to 5000 cps and are useful for formulating plastisols.

The epoxy plasticizer of the invention compositions functions as a biodegradable plasticizer and acid scavenger/neutralizer in combination with the vinyl resin. That is, the epoxy plasticizer aids in the formation of moldable plastisols of the vinyl resin, and also can neutralize possible small amounts of acid generated in the vinyl resin containing composition during heating such as hydrochloric acid. These epoxy plasticizers may be natural, synthesized, or derivatized natural materials. The epoxy plasticizer may be an epoxidized oleochemical such as an epoxidized fatty acid ester component. The epoxidized fatty acid esters generally include esters of polyhydroxylic alcohols with aliphatic acids containing epoxy groups. A particular class of these materials is the epoxidized triglycerides, such as prepared by the epoxidation of unsaturated fats of vegetable or animal origin with peroxyacetic acid or a hydroperoxide. These include such materials as epoxidized soybean oil, epoxidized linseed oil, epoxidized tall oil, epoxidized crambe oil, epoxidized lunaria oil, and the like. The epoxide content of these materials generally will vary with the degree of completion of the epoxidation reaction and also with the amount of unsaturation present in the original oil. Esters of unsaturated fatty acids with polyhydroxylic alcohols other than glycerol may be prepared and epoxidized by processes similar to those used to epoxidize the natural unsaturated triglycerides. The products of such reactions would likewise be applicable in this invention. Examples of such materials would include epoxidized polyethylene glycol dioleate, epoxidized polypropylene glycol dioleate, epoxidized pentaerythritol tetraabietate, and the like. Commercial sources of epoxidized fatty acid esters, include, for example, Plastoflex® 2307, an epoxidized soybean oil, available from Akcros Chemicals America, and Drapex® 4.4, an epoxidized octyl tallate, available from Chemtura Corporation. Natural epoxy plasticizing oils also may be used, such as octyl epoxy stearate (9,10-epoxystearic), coronaric acid (9,10-epoxyoctadec-12-enoic), vernolic acid (12,13-epoxy-9-octadecenoic acid), and alchornic acid (cis-14,15-epoxy-cis-11-eicosenoic acid), and so forth.

The body of the fishing lure also may include a supplemental plasticizer. This supplemental plasticizer is preferably non-toxic and biodegradable, and is compatible with the vinyl resin and epoxy plasticizer, and other ingredients of the lure formulation. Supplemental plasticizers that may be used in the present invention include citrate plasticizers, methyl esters of hydrogenated rosins, polyester plasticizers, and dipropylene glycol dibenzoate. In particular embodiments, the supplemental plasticizer may be a citrate plasticizer, which are citric acid esters. Examples of such citric acid esters include acetyltri-n-butyl citrate, triethyl citrate, acetyltriethyl citrate, tri-n-butyl citrate, acetyltri-n-hexyl citrate, n-butyryltri-n-hexyl citrate, singly or in combinations thereof. Examples of commercially available citric acid esters are Citroflex® A-4, Citroflex® A-6, Citroflex® A-2, Citroflex® B-6, Citroflex® C-2, Citroflex® C-4 citric acid esters available from Morflex, Inc., Greensboro, N.C. These citric acid esters are available in odorless, clear liquid forms. They have strong solvency with a low order of toxicity, low volatility, high flash points, and relatively rapid biodegradability relative to other ingredients of the lure such as the vinyl resin and/or epoxy plasticizer. In general, these citric acid esters plasticizers may have a more rapid rate of biodegradation when immersed in the same water than many epoxy plasticizers such as epoxidized soybean oils. As the epoxy plasticizer and citrate plasticizer may have different biodegradability rates when immersed in the same water, the relative amount of supplemental plasticizer such as citrate plasticizer, if present, relative to the epoxy plasticizer, may be proportioned relative to each other to fine-tune the overall rate of biodegradation of the lure body.

The lure body formulations also may include a heat stabilizer relative to the vinyl resin component. The heat stabilizer can act as a scavenger for possible small amounts of chlorine gas that may be generated during heating of the vinyl resin. This stabilizer may be, for example, a mixed metal salt blend. Generally, the stabilizer is free of lead content, although lead containing stabilizers are not categorically excluded. The heat stabilizer may be selected, for example, from one or more of barium/zinc (Ba/Zn), calcium/zinc (Ca/Zn), and or aluminum/magnesium/calcium/zinc (Al/Mg/Ca/Zn), and so forth. These heat stabilizers may be used in minor amounts such as less than about 2 wt %, particularly about 0.1 to about 1.5 wt % of the overall lure formulation. The heat stabilizer also may comprise organotin compounds, and metal-free organic compounds such as organosulfides and heterocyclic compounds having the desired function.

Selection of the relative amount of vinyl resin and plasticizers in the body of the fishing lure provides an additional way to control the flexibility, elasticity, hardness, tear strength and/or tensile strength of the body of the fishing lure. In particular, using a larger amount of plasticizers generally reduces the material's hardness, tensile break strength and tear strength but increases flexibility and elasticity. Further, the rate of decomposition of the body of the fishing lure when it is immersed in water may be controlled by varying the weight ratio of vinyl resin to epoxy plasticizer and any supplemental plasticizer, with a greater amount of plasticizer generally increasing the decomposition. For example, the weight ratio of epoxy plasticizer weight to vinyl resin weight may generally range from about 5:1 to about 1:1, respectively. Where a supplemental plasticizer such as citrate plasticizer is included, for example, the weight ratio of epoxy plasticizer weight, vinyl resin weight and citrate plasticizer weight, may generally range from about 9:1.5:1 to about 1:1:5, respectively. As previously indicated, the epoxy plasticizer and citrate plasticizer, if present, may have different biodegradability rates when immersed in the same water, such that the relative amount of supplemental plasticizer such as citrate plasticizer, if present, relative to the epoxy plasticizer, also may be proportioned to fine-tune the overall rate of biodegradation of the lure body. Other weight ratios can be used.

The body of the fishing lure may also include at least one fish attractant. The fish attractant can be any material that is capable of attracting fish to the lure, such as, for example, a visual attractant, a scent attractant, a food attractant, a feeding stimulant, or a combination of any of these. Examples include, but are not limited to, menhaden oil, hydrolyzed fish protein, fish oil, fish meal, ground crustaceans, ground mussels, fish powder, fruit, spices, garlic, garlic oil, extracts, glitter materials (e.g., metallic and/or polymeric glitter), and/or coloring agents (e.g., food grade colors, like dyes). Preferably, the fish attractant is a scent that is homogeneously present in or distributed throughout the body of the fishing lure. The fish attractant can be released in active form when the body of the fishing lure is immersed in water. The body of the fishing lure can contain visual attractants such as glitter and coloring agents. The fish attractant can be present in an amount of from 0.1 wt % to 16 wt % or more, based on the overall weight of the lure.

The fish attractant may be a substance that also has properties of a plasticizer. For example, fish oil such as menhaden oil can serve as both a plasticizer and a fish attractant. As a specific, non-limiting example, a menhaden fish oil plasticizer/fish attractant is commercially available from Glory-Hole Fishing Products, Boyd, Tx. Depending on the type of fish attractant, if present, an antioxidant may by useful for color stability considerations. For example, an antioxidant effective to stabilize color of menhaden oil also may be used in conjunction with that fish attractant. Color stabilizing antioxidants in this respect include, for example, certain high molecular weight hindered phenols, which are commercially available, such as Antioxidant 176 from Lenape Industries Inc., Hillsborough, N.J. These antioxidants may be used in small amounts in the lure compositions. Where hindered phenols are used in the presence of menhaden oil, an amount of 0.01 wt % to 0.1 wt % of the antioxidant may be used.

The mechanical, tactile and water degradable properties of the fishing lure can be controlled by selection of the monomer composition and molecular weight of the vinyl resin, and the epoxy content of the epoxy plasticizer. For example, increasing the molecular weight of the vinyl resin and/or epoxy content of the epoxy plasticizer generally increases the hardness, tensile break strength, and tear strength, but decreases flexibility, elasticity, and degradability, and reducing the molecular weight of the vinyl resin and/or epoxy content of the epoxy plasticizer tends to have opposite effects, where all other factors are generally equal.

Additionally or alternatively, the mechanical, tactile and water degradable properties of the fishing lure also may be controlled by selecting relative amounts of each of the vinyl resin and epoxy plasticizer, and, if present, the supplemental plasticizer, and any fish attractant(s) that also acts like a plasticizer. For example, increasing the amount of the vinyl resin relative to the plasticizer(s) generally increases the hardness, tensile break strength, and tear strength, but decreases flexibility, elasticity, and degradability, and decreasing the amount of the vinyl resin relative to the plasticizer(s) tends to have opposite effects, where all other factors are generally equal.

The ability to select and fine-tune particular properties by selection amongst the lure ingredients exemplified herein and their relative amounts is particularly useful to obtain an acceptable combination of various properties in the finished pure product. Particularly, selections may have an inverse effect on many of the physical properties, such that a certain amount of compromise may be necessary. For example, as discussed above, making a selection that increases the hardness, tensile break strength and tear strength of the material tends to decrease the flexibility, elasticity, and biodegradability of the material. The materials for the body of the fishing lure may be selected so that the fishing lure is flexible and elastic enough to provide proper lure movement through the water in a matter that is realistic and attractive to fish. The material may be selected to provide toughness and cohesive strength so that a hook is retained by the lure, even after the material is stressed by repeated water impacts during casting and is subjected to water drag forces during trolling. The material may be selected to provide a surface topology that mimics the slippery feel and appearance of live bait. As an example, materials for the body of the fishing lure may be selected to obtain a material that that has properties of an initial tensile strength at break of from about 10 psi to about 60 psi, particularly from 40 to 50 psi; an initial tear strength of from about 0.2 to about 6.0 lb/inch, particularly from 3.5 to 4.0 lb/inch; an initial modulus at 10% elongation of from about 20 to about 130 psi, particularly from 110 to 125 psi; an initial elongation at break of from about 40 to about 150%, particularly from 120 to 130%; an initial energy to break of from about 0.01 to about 0.6 in-lb$_f$, particularly from 0.40 to 0.45 in-lb$_f$; and an initial torsional modulus of from 7.0 to 16 psi, particularly from 10 to 16 psi; or any combination thereof. The fishing lure preferably degrades slowly in water so that after the body is immersed in fresh water (but can be salt water) at an ambient temperature (e.g., 25° C.) for 24 hours, the body has a tensile strength at break of from 35 to 50 psi, a tear strength of from 2.2 to 3.5 lb/inch, a modulus at 10% elongation of from 105 to 130 psi, an elongation at break of from 80 to 120%, an energy to break of from 0.35 to 0.4 lb/inch, and/or a torsional modulus of from about 6 to about 16 psi. However, after prolonged immersion in water, the fishing lure begins to completely degrade so that after the body is immersed in fresh water at an ambient temperature (e.g., 25° C.) for 2600 hours, the body has a tensile strength at break of 45 psi or less, a tear strength of 3.3 lb/inch or less, a modulus at 10% elongation of 115 psi or less, an elongation at break of 95% or less, an energy to break of 0.34 lb/inch or less, and/or a torsional modulus of from 12 psi or less. The physical parameters herein are measured based on ASTM standards, and in particular, ASTM standards D412, D624, D2240, and D1053.

The rate of degradability of the body of the fishing lure may be controlled so that these properties are retained during normal use of the fishing lure. For example, the tensile strength at break after the body is immersed in fresh water at an ambient temperature for 24 hours may be within about 100% to about 90% of the initial tensile strength at break. The tear strength after the body is immersed in fresh water at an ambient temperature for 24 hours may be within about 90% to about 60% of the initial tear strength. The modulus at 10% elongation after the body is immersed in fresh water at an ambient temperature for 24 hours may be within about 80% to about 120% of the initial modulus at 10% elongation. The elongation at break after the body is immersed in fresh water at an ambient temperature for 24 hours may be within about 60% to about 75% of the initial elongation at break. The energy to break after the body is immersed in fresh water at an ambient temperature for 24 hours may be within about 80% to about 100% of the initial energy to break. The torsional modulus after the body is immersed in fresh water at an ambient temperature for 24 hours may be within about 80 to 120% of the initial torsional modulus. Further, the hydration and degradability of the material can be selected to control the rate at which a fish attractant is released after the body is immersed in water. For example, the percent content of fish attractant after the body is immersed in fresh water at an ambient temperature for 24 hours may be within about 80% to about 90% of the initial percent content of fish attractant.

The rate of degradability of the body of the fishing lure may be controlled so that after the fishing lure has been immersed for a substantial period of time, such as after the fishing lure has broken off and become lost, the body of the fishing lure begins to completely degrade. For example, the tensile strength at break after the body is immersed in fresh water at an ambient temperature for 2600 hours may be within from about 90% to about 80% of the initial tensile strength at break. The tear strength after the body is immersed in fresh water at an ambient temperature for 2600 hours may be within from about 50% to about 20% of the initial tear strength. The modulus at 10% elongation after the body is immersed in fresh water at an ambient temperature for 2600 hours may be within from about 90% to about 80% of the initial modulus at 10% elongation. The elongation at break after the body is immersed in fresh water at an ambient temperature for 2600 hours may be within from about 70% to about 80% of the initial elongation at break. The energy to break after the body is immersed in fresh water at an ambient temperature for 2600 hours may be within from about 70% to about 80% of the initial energy to break. The torsional modulus after the body is immersed in fresh water at an ambient temperature for 2600 hours may be within from about 60% to 90% of the initial torsional modulus. The percent content of fish attractant after the body is immersed in fresh water at an ambient temperature for 2600 hours may be within from about 60% to about 70% of the initial percent content of fish attractant.

In one or more embodiments of the present invention, one or more of the fishing lure physical properties may initially increase after so many hours, such as after 10 to 300 hours. One or more of the properties may increase initially due to the water displacing the oil plasticizer(s) in the fishing lure, wherein the water may act as a type of plasticizer which will actually cause toughening of the fishing lure, such as through hydrogen bonding. Ultimately, once hydrolysis starts occurring and the polymer begins to break down, the one or more of the physical properties and preferably all of the physical properties will begin to decrease and, over time, dramatically decrease from the initial physical properties of the fishing lure prior to being placed in water. Thus, in one or more embodiments of the present invention, the one or more physical properties of this fishing lure may increase initially for several hours and then ultimately decrease after additional hours and ultimately degrade in the water. In one embodiment of the present invention, one or more of the initial physical properties, such as initial tensile strength at break, initial tear strength, initial modulus at 10% elongation, initial elongation at break, initial energy to break, and/or initial torsional modulus can decrease by 5% to 10% or more once immersed in fresh water at a temperature of 25° C. for 100 hours to 500 hours or more. The percent of degradation of at least one or more of these physical properties can be on the order of 10% to 50%, or 5% to 50%, or 10% to 25%, or 10% to 35% of the one or more of the initial physical properties of the fishing lure after being immersed in fresh water at 25° C. for 100 hours to 500 hours or more (e.g., 100 hours to 400 hours, 100 hours to 300 hours, 100 hours to 200 hours, 100 hours to 750 hours, 300 hours to 750 hours, 300 hours to 1,000 hours, 300 hours to 2,000 hours, 500 hours to 3,000 hours, and the like). Preferably, at least two of the physical properties, at least three of the physical properties, at least four of the physical properties, at least five of the physical properties, or all six of the physical properties can decrease by these percentages over time to ultimately lead to a water-degraded product in the water.

As a non-limiting example, the body of a fishing lure according to the present invention may comprise a vinyl resin (e.g., PVC homopolymer dispersion grade resin) in an amount of from about 5% to about 30% by weight, an epoxy plasticizer (e.g., epoxidized soybean oil) in an amount of from about 10% to about 80% by weight, a supplemental plasticizer (e.g., a citrate plasticizer) in an amount of from 0 to about 80% by weight, a fish attractant (e.g., menhaden oil) in an amount of from 0 to about 25% by weight, an antioxidant (e.g., hindered phenol) in an amount of from 0 to about 0.5% by weight, and a heat stabilizer (e.g., Ba/Zn) in an amount of from 0 to about 2% by weight. In a particular embodiment, the body of a fishing lure according to the present invention may comprise a vinyl resin (e.g., PVC homopolymer dispersion grade resin) in an amount of from about 10% to about 20% by weight, an epoxy plasticizer (e.g., epoxidized soybean oil) in an amount of from about 15% to about 70% by weight, a supplemental plasticizer (e.g., a citrate plasticizer) in an amount of from about 7% to about 70% by weight, a fish attractant (e.g., menhaden oil) in an amount of from about 1% to about 20% by weight, an antioxidant (e.g., hindered phenolic) in an amount of from 0 to about 0.1% by weight, and a heat stabilizer (e.g., Ba/Zn) in an amount of from about 0.1% to about 1.5% by weight.

In various embodiments, the lure is ultimately 100 wt % or essentially 100 wt % water degradable upon sufficiently sustained water immersion and sunlight exposure. In various exemplary embodiments, and depending on the particular lure formulation, approximately 95 wt % to 70 wt %, and particularly approximately 80 wt % to 90 wt %, of the lure degrades in water in a relatively short time period (within 1 month, within 3 months, within 6 months, within one year) of sustained immersion for durations exceeding immersion periods typical to normal fishing applications, and the remaining approximately 5 wt % to 30 wt %, or approximately 20 wt % to 10 wt %, respectively, weight content of the lure, which in various embodiments may be comprised predominantly of the PVC content, also degrades upon sufficiently prolonged periods of continued immersion in water and exposure to ultraviolet light, such as sunlight (such as months, like 6 months or more, one year or more, 6 months to two years or more).

The fishing lure may be manufactured by any method for combining vinyl resin and epoxy plasticizer, and, if present, other ingredients such as supplemental plasticizer, heat stabilizer, fish attractant(s), antioxidant, and so forth, such as, for example, conventional polymer melt processing techniques. For example, the ingredients or components that make up the body of the fishing lure can be mixed together in any order by any means, such as mixing at an elevated temperature to form a homogeneous thermoplastic material. The heated homogenous thermoplastic material is moldable. That is, it can be poured, extruded, cast, and so forth into a molding die or other molding surface defining the desired lure body shape, and the composition conforms to the defined shape and can be released from the mold with the imparted shape intact upon cooling. For example, the components may be mixed at a temperature of from about 325° F. to about 385° F. (about 163° C. to about 196° C.) for from about 15 minutes to about 30 minutes or for any other period of time, for example, sufficient to create a homogeneous mixture. The mixed components may be formed into any shape, particularly into any shape suitable for use as a fishing lure. For example, the fishing lure may be in any shape that mimics a natural food of a fish, such as a minnow, worm, shrimp, crayfish, squid, crab, water flea, plant, fruit, and the like. The fishing lure may be in any other shape that may draw the attention of a fish. The fishing lure may be formed by any suitable method such as extrusion or molding, for example. As a non-limiting example, the ingredients of the body of the fishing lure may be melt mixed in a heating mantle at about 380° F. (193° C.), and then poured into a mold imparting a particular shape, such as a worm shape. As another non-limiting example, the ingredients of the body of the fishing lure may be melt mixed in a co-rotating twin screw extruder at about 380° F. and then molded into a particular shape, such as a worm shape. The material can be used in an injection molding machine to produce any lure shape or size. At the time of molding, additional coloring agents may be added to improve the simulation of a particular natural food of a fish. The fishing lure may also include a hook or a line attachment fastened onto or incorporated into the body of the fishing lure and may include additional features such as streamers or simulated fish eyes, for example, to attract the attention of fish.

Typically, the body of the fishing lure of the present invention has a density that is slightly greater than water. The body of the fishing lure may be made less dense by infusing air cavities into the material of the fishing lure during manufacturing, and may be made denser by adding filler such as a high density inorganic filler. Examples of various densities are from 0.8 sp. gravity to 1.25 sp. gravity.

The body of the fishing lure may also contain additives such as stabilizers and UV protection agents, in addition to or in lieu of those indicated above, so that the fishing lure does not degrade during normal exposure to sunlight, such as during storage prior to use.

The present invention will be further clarified by the following examples, which are intended to be exemplary of the present invention.

EXAMPLES

Example 1

A composite lure material was made by melt mixing a series of formulations described in Table 1 containing various weight proportions of a vinyl resin ("VR") commercially obtained as Geon® 121, made by Polyone, Avon Lake Ohio, a homopolymer PVC dispersion resin; epoxidized soybean oil ("ESO") obtained as Plastoflex® 2307; citric acid ester ("CAE") plasticizer obtained as Citroflex® A-4 from Morflex, Inc., Greensboro, N.C.; menhaden oil ("MO") coplasticizer and fish attractant provided by Glory-Hole Fishing Products, Boyd, Tex.; antioxidant ("AO") obtained as Antioxidant 176 from Lenape Ind. Inc., a hindered phenolic antioxidant; and a heat stabilizer ("HS") provided as Ba—Zn and obtained from Akcros Chemicals. The general mixing procedure included weighing the liquids and placing them in a mixing container, then VR was added with rapid stirring, followed by addition of the AO. The mixture of each formulation was placed in a heating mantle, and the mixture was stirred until the pour temperature indicated in Table 2 was reached. The composite material of each formulation was poured into a mold for molding into a 0.5 ounce body having a 0.5 inch diameter by 8 inch long worm-like shaped fishing lures.

TABLE 1

Lure Formulations 1-11, in weight percentages.

|     | 1 | 2 | 3 | 4 | 5 | 6 | 7 | 8 | 9 | 10 | 11 |
|---|---|---|---|---|---|---|---|---|---|---|---|
| VR  | 14.49 | 14.49 | 14.49 | 14.49 | 14.49 | 14.49 | 14.49 | 14.49 | 14.49 | 14.49 | 14.49 |
| ESO | 68.6  | 68.58 | 68.58 | 68.6  | 16.1  | 24.15 | 32.21 | 40.26 | 48.31 | 56.36 | 64.41 |
| CAE | 0     | 0     | 8.05  | 16.1  | 68.6  | 60.55 | 52.49 | 44.44 | 36.39 | 28.34 | 20.29 |
| MO  | 16.1  | 16.1  | 8.05  | 0     | 0     | 0     | 0     | 0     | 0     | 0     | 0 |
| AO  | 0     | 0.03  | 0.03  | 0     | 0     | 0     | 0     | 0     | 0     | 0     | 0 |
| HS  | 0.81  | 0.8   | 0.8   | 0.81  | 0.81  | 0.81  | 0.81  | 0.81  | 0.81  | 0.81  | 0.81 |
| Total | 100 | 100 | 100 | 100 | 100 | 100 | 100 | 100 | 100 | 100 | 100 |

TABLE 2

Processing Temperatures (° F.) of Formulations 1-11.

|     | 1 | 2 | 3 | 4 | 5 | 6 | 7 | 8 | 9 | 10 | 11 |
|---|---|---|---|---|---|---|---|---|---|---|---|
| Viscosity Rise | 270 | 271 | 271 | 250 | 244 | 245 | 243 | 245 | 246 | 246 | 247 |
| Initial Clearing | 277 | 278 | 277 | 251 | 252 | 253 | 251 | 248 | 249 | 250 | 250 |
| Completely Clear | 310 | 312 | 311 | 278 | 291 | 294 | 293 | 284 | 288 | 289 | 289 |
| Pour Temp. | 380 | 380 | 380 | 380 | 380 | 380 | 380 | 330 | 350 | 330 | 330 |

The resulting lures had feel, flexibility, elasticity and hook setting properties that correlated with what is needed for fishing. They also store stably in packaging or as otherwise exposed to ambient air. The lures also exhibit very limited if any initial degradation when immersed in water for short periods of time, but undergo significant structural degradation when immersed in water for prolonged periods of time.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present teachings will be apparent to those skilled in the art from consideration of the specification and practice of the present teachings disclosed herein. It is intended that the specification and examples be considered as exemplary only, with the true scope and spirit of the present invention being indicated by the following claims and equivalents thereof.

What is claimed is:

1. A fishing lure comprising a body that comprises at least one polyvinyl chloride (PVC) dispersion grade resin, at least one epoxy plasticizer, a citrate plasticizer present in an amount sufficient to impart biodegradability to the fishing lure body, and at least one fish attractant, wherein the body is degradable over time upon immersing the body in water such that the body exhibits a tear strength that is within 20% to 50% of an initial tear strength after immersion in fresh water at ambient temperature for 2600 hours, and the epoxy plasticizer and the PVC dispersion grade resin are present in a weight ratio ranging from about 5:1 to about 1:1, respectively.

2. The fishing lure of claim 1, wherein the PVC dispersion grade resin is a PVC homopolymer dispersion grade resin, a PVC-polyvinyl acetate (PVA) copolymer dispersion grade resin, a PVC homopolymer extender grade resin, or a PVC-PVA copolymer extender grade resin, singly or in any combination thereof.

3. The fishing lure of claim 1, wherein the PVC dispersion grade resin has a number average molecular weight of from about $4 \times 10^4$ to about $8.5 \times 10^4$.

4. The fishing lure of claim 1, wherein the at least one epoxy plasticizer comprises an epoxidized fatty acid ester.

5. The fishing lure of claim 1, wherein the at least one epoxy plasticizer is epoxidized soybean oil, epoxidized linseed oil, epoxidized tall oil, epoxidized crambe oil, epoxidized lunaria oil, octyl epoxy stearate, coronaric acid, vemolic acid, or alchornic acid, singly or in any combination thereof.

6. The fishing lure of claim 1, wherein the citrate plasticizer comprises acetyltri-n-butyl citrate, triethyl citrate, acetyltriethyl citrate, tri-n-butyl citrate, acetyltri-n-hexyl citrate, or n-butyryltri-n-hexyl citrate, singly or in any combination thereof.

7. The fishing lure of claim 1, further comprising a heat stabilizer.

8. The fishing lure of claim 7, wherein the heat stabilizer is barium/zinc, calcium/zinc, and aluminum/magnesium/calcium/zinc, singly or in any combination thereof.

9. The fishing lure of claim 1, wherein the at least one fish attractant is menhaden oil, hydrolyzed fish protein, fish oil, fish meal, ground crustaceans, ground mussels, fish powder, fruit, spices, garlic, garlic oil, glitter materials, coloring agents, singly or in any combination thereof.

10. The fishing lure of claim 1, wherein the fish attractant comprises menhaden oil.

11. The fishing lure of claim 10, further comprising an antioxidant effective to stabilize color of said menhaden oil.

12. The fishing lure of claim 1, wherein the at least one fish attractant is a scent that is released in active form upon immersing the body in water.

13. The fishing lure of claim 1, wherein at least one fish attractant is present and the rate at which the at least one fish attractant is released in active form upon immersing the body in water is selected by selecting the relative amounts of the other components of the body of the lure.

14. The fishing lure of claim 1, wherein the body has an initial tensile strength at break, and wherein a tensile strength at break after the body is immersed in fresh water at a temperature of 25° C. for 24 hours is within at least 90% of the initial tensile strength at break and wherein a tensile strength at break after the body is immersed in fresh water at a temperature of 25° C. for 2600 hours is less than 90% of the initial tensile strength at break.

15. The fishing lure of claim 1, wherein the body has an initial tear strength, and wherein a tear strength after the body is immersed in fresh water at a temperature of 25° C. for 24 hours is within at least 60% of the initial tear strength and wherein a tear strength after the body is immersed in fresh water at a temperature of 25° C. for 2600 hours is less than 50% of the initial tear strength.

16. The fishing lure of claim 1, wherein the body has an initial modulus at 10% elongation, and wherein a modulus at 10% elongation after the body is immersed in fresh water at a temperature of 25° C. for 24 hours is within at least 90% of the initial modulus at 10% elongation and wherein a modulus at 10% elongation after the body is immersed in fresh water at a temperature of 25° C. for 2600 hours is less than 90% of the initial modulus at 10% elongation.

17. The fishing lure of claim 1, wherein the body has an initial elongation at break, and wherein an elongation at break after the body is immersed in fresh water at a temperature of 25° C. for 24 hours is within at least 80% of the initial elongation at break and wherein an elongation at break after the body is immersed in fresh water at a temperature of 25° C. for 2600 hours is less than 80% of the initial elongation at break.

18. The fishing lure of claim 1, wherein the body has an initial energy to break, and wherein an energy to break after the body is immersed in fresh water at a temperature of 25° C. for 24 hours is within at least 80% of the initial energy to break and wherein an energy to break after the body is immersed in fresh water at a temperature of 25° C. for 2600 hours is less than 70% of the initial energy to break.

19. The fishing lure of claim 1, wherein the body has an initial percent content of fish attractant, and wherein a percent content of fish attractant after the body is immersed in fresh water at a temperature of 25° C. for 24 hours is within at least 90% of the initial percent content of fish attractant and wherein a percent content of fish attractant after the body is immersed in fresh water at ambient temperature for 2600 hours is less than 90% of the initial percent content of fish attractant.

20. The fishing lure of claim 1, wherein the body has an initial torsional modulus to break, and wherein the torsional modulus to break after the body is immersed in fresh water at a temperature of 25° C. for 24 hours is within at least 80% of the initial torsional modulus to break and wherein the torsional modulus after the body is immersed in fresh water at a temperature of 25° C. for 2600 hours is less than 80% of the initial torsional modulus to break.

21. A fishing lure comprising a body that comprises at least one polyvinyl chloride (PVC) dispersion grade resin, at least one epoxy plasticizer, a citrate plasticizer present in an amount sufficient to impart biodegradability to the fishing lure body, and at least one fish attractant, wherein the body is degradable over time upon immersing the body in water such that the body exhibits a tear strength that is within 20% to 50% of an initial tear strength after immersion in fresh water at ambient temperature for 2600 hours, wherein the epoxy plasticizer, the PVC dispersion grade resin, and citrate plasticizer are present in a weight ratio ranging from about 9:1.5:1 to about 1:1:5, respectively.

22. A fishing lure comprising a body that is degradable over time upon immersing the body in water such that the body exhibits a tear strength that is within 20% to 50% of an initial tear strength after immersion in fresh water at ambient temperature for 2600 hours, wherein the body comprises from about 10% to about 20% by weight vinyl resin, from about 15% to about 70% by weight epoxy plasticizer, from about 7% to about 70% by weight citrate plasticizer, from 0 to about 85% by weight supplemental plasticizer, fish attractant comprising menhaden oil present is an amount of from 1% to about 20% by weight, from 0 to about 0.1% by weight antioxidant, and from 0.1% to about 1.5% by weight heat stabilizer.

* * * * *